(12) United States Patent
Pöyhönen et al.

(10) Patent No.: US 7,502,923 B2
(45) Date of Patent: Mar. 10, 2009

(54) SYSTEMS AND METHODS FOR SECURED DOMAIN NAME SYSTEM USE BASED ON PRE-EXISTING TRUST

(75) Inventors: Petteri Pöyhönen, Helsinki (FI); Hannu Flinck, Helsinki (FI)

(73) Assignee: Nokia Corporation, Espoo (FI)

( * ) Notice: Subject to any disclaimer, the term of this patent is extended or adjusted under 35 U.S.C. 154(b) by 871 days.

(21) Appl. No.: 10/943,050

(22) Filed: Sep. 16, 2004

(65) Prior Publication Data
US 2006/0059337 A1 Mar. 16, 2006

(51) Int. Cl.
*H04L 9/00* (2006.01)
(52) U.S. Cl. ........................ 713/153; 713/165
(58) Field of Classification Search ............. 713/153, 713/165
See application file for complete search history.

(56) References Cited

U.S. PATENT DOCUMENTS

| | | | |
|---|---|---|---|
| 6,961,783 B1* | 11/2005 | Cook et al. | 709/245 |
| 7,296,155 B1* | 11/2007 | Trostle et al. | 713/170 |
| 2004/0083306 A1 | 4/2004 | Gloe | |
| 2004/0233898 A1* | 11/2004 | Otsuka et al. | 370/352 |
| 2005/0265327 A1* | 12/2005 | Buch et al. | 370/389 |
| 2006/0155871 A1* | 7/2006 | Ilkka et al. | 709/238 |

FOREIGN PATENT DOCUMENTS

EP 1234433 B1 9/2005

OTHER PUBLICATIONS

A. Escudero and G.Q. Maguire, Jr.; Role(s) of a Proxy in Location Based Services; 13th IEEE International Symposium on Personal, Indoor and Mobile Radio Communications, Sep. 15-18, 2002, Lisbon, Portugal, Proceedings vol. 3 of 5, pp. 1252-1257; IEEE, 2002.

* cited by examiner

*Primary Examiner*—Andrew L Nalven
(74) *Attorney, Agent, or Firm*—Alston & Bird LLP

(57) ABSTRACT

Systems, devices and methods are presented for providing controlled use of information stored publicly within the domain name system (DNS). Controlled use is established by storing encrypted data at the DNS servers and establishing trust, in the form of transfer of keying material, with requisite parties. The invention provides backward compatibility with existing DNS servers, in that, it provides for storage of encrypted data in existing resource records. The invention benefits from allowing storage in the DNS to be divided into both public and private classification, such that a user can identify and store certain public information that is available to all parties that have access to the DNS, while other information that has been classified as private is only available to parties which have established a trust.

63 Claims, 9 Drawing Sheets

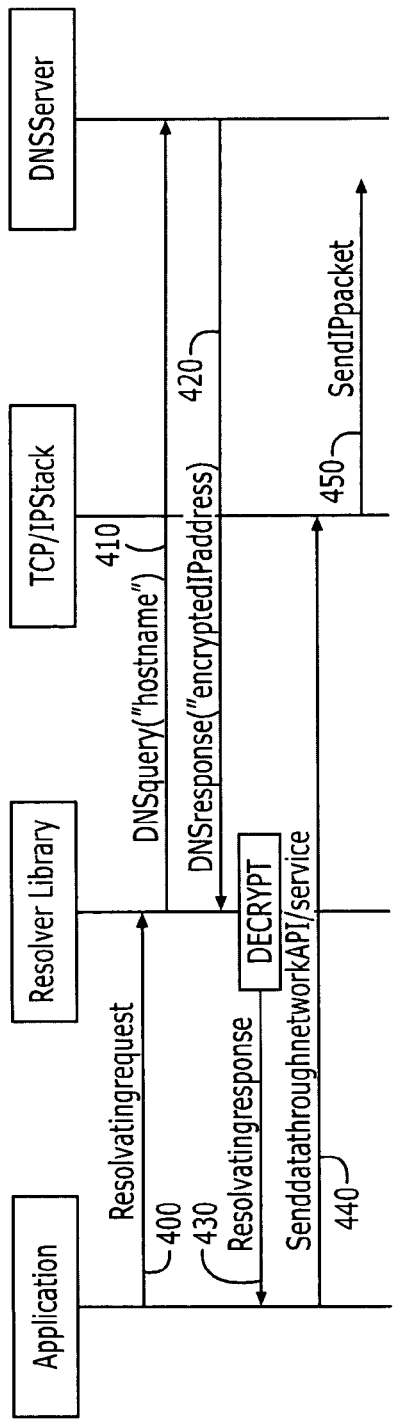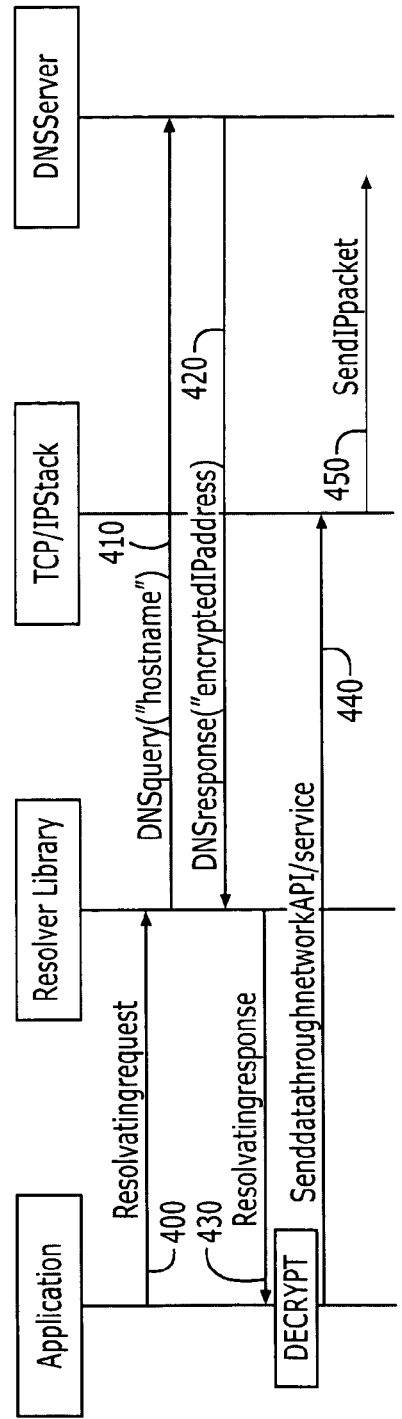

SYSTEMS AND METHODS FOR SECURED DOMAIN NAME SYSTEM USE BASED ON PRE-EXISTING TRUST

FIELD OF THE INVENTION

The present invention relates to communication networks and, more specifically to methods and systems for the secured use of domain name system.

BACKGROUND OF THE INVENTION

Domain name system, commonly referred to as DNS (specified, e.g. in RFC's (Request For Comment) 1034 and 1035), and domain names are a prominent part of conventional networking, such as public Internet networking. A user that relies on the Internet to send electronic mail, i.e., e-mail or browse the Web, will employ the use of DNS without even realizing it.

In one application, DNS servers are used to translate domain names to Internet Protocol (IP) addresses. While network users will generally refer to an Internet domain, such as nokia.com, yahoo.com or amazon.com, by name, the hardware that comprises the network will recognize the domain by the IP address assigned to the domain, for example, an IP address such as 216.183.103.150. Thus, the DNS system acts as a distributed database for IP addresses and every device currently residing on the network has its own IP address. Certain devices, such as servers, have a static IP address that does not change very often, while user devices, such as personal computers, laptops and the like that, by example, dial into the network through a modem often have an IP address that is, in one application, assigned by a Dynamic Host Configuration Protocol (DHCP) server associated with the Internet Service Provider (ISP). The DNS system is considered a distributed database because every domain in the network has its own DNS that handles IP address resolving requests.

Functionally, DNS accepts requests from clients or other name servers to convert domain names into IP addresses. When a request is received by a name server the server will either answer the request with a known cached IP address for the requested domain, contact another name server in an attempt to find the IP address for the requested domain, inform the requester which name server may know the IP address of the requested domain or inform the requester that the domain name is unknown.

Conventionally, all data stored in the DNS or accessible to the DNS is generally considered to be public data that is available to all users having access to the DNS through the network. However, some of the user's service dependent identities, such as email addresses and the like, may be deemed by the user as private and, as such, cannot be stored in the DNS in the conventional manner. In these instances the identities/addresses must be distributed in a different manner, such as manually by the user either internal to the network or external to the network.

Thus a need exists to develop a system and corresponding methods for the private use of existing portions of a public distributed database, such as the DNS database. The desired methods and systems should provide for backward compatibility with the existing DNS servers. Additionally, the desired methods and systems should provide for a user to store network addresses and service dependent addresses within the DNS and provide for private use of these addresses only to those parties that have established a trust with the user. Additionally, the desired systems and methods should provide for the data stored in the DNS to be divided into both public and private classification, such that a user can identify and store certain public information that is available to all parties that have access to the DNS while other information that has been classified as private is only useable to parties which have established a trust.

BRIEF SUMMARY OF THE INVENTION

The present invention provides for devices, systems methods and computer program products for the private use of existing portions of a public distributed database, such as the domain name system (DNS) database. The invention provides backward compatibility with existing DNS servers; specifically use of existing resource records. The invention provides for a user to store information for private use, such as network addresses, service dependent addresses and the like within the DNS and provides for visibility through encryption/decryption of the information to only those parties that have established a trust with the user. Additionally, the invention provides for the data stored in the DNS to be divided into both public and private classification, such that a user can identify and store certain public information that is available to all parties that have access to the DNS, while other information that has been classified as private is only usable to parties which have established a trust.

The invention is embodied in a method for distributing private information through a public distributed database system. The method includes the steps of communicating at least a portion of encrypted data to a domain name system (DNS), storing the at least a portion of the encrypted data in a memory unit associated with the DNS, communicating encryption data-related keying material, encryption identifying data and, optionally, reference to the corresponding service from a first user associated with the encrypted data to a second user that has a pre-existing trust established with the first user, querying the DNS for at least a portion of the encrypted data based upon the encryption identifying data and decrypting the at least a portion of the encrypted data based upon the keying material. The encrypted data may be communicated via wireless or wireless communication medium to the DNS. The encrypted data may be encrypted, prior to communication to the DNS, using a conventional encryption application.

In one embodiment, the DNS will store the encrypted data in resource records, typically pre-existing resource records, which store information according to the type of information. The resource records may provide for flag indicator fields that, when enabled, indicate that information stored therein as encrypted and may not be compatible with server syntax or semantics.

The first user will communicate encryption data-related keying material, encryption identifying data and, optionally, reference to the corresponding service to the second user or in alternate embodiments at least the keying material will be communicated from the first user to multiple users. The pre-existing trust that exists between the first and second user may be a direct trust (i.e., the users know each other or a relationship exists) or the trust may be indirect (i.e. a third party is involved that has knowledge of the first and second users). The keying material is communicated from the first user to the second user based on a pre-existing trust. The keying material allows the second user to decrypt the encrypted data that is stored at the DNS. The encryption identifying data may be communicated from the first user to the second user at any point in time prior to querying the DNS for at least a portion of the encrypted data. The keying material may be communicated to the user of the second network node at any point in time prior to performing the decryption process. While the keying material, encryption identification information and optional reference to the corresponding service are, in one embodiment, communicated in unison, no such requirement exists and therefore they may be communicated in separate communications. Additionally, the manner by which the keying material, the encryption identification information and optional reference to the corresponding service are communicated between users is immaterial, the manner can be manual (i.e., verbal, face-to-face communication) or electronic (i.e., email, SMS, MMS, IM telephone conversation, voice mail or the like).

Decryption of the encrypted information may occur within a digital device at the resolver library stage, at the network application stage or at the TCP/IP stack stage on behalf of the network application. Alternatively, decryption may occur at other stages/levels within the network. The stage at which decryption is performed may be associated with the type of information that is encrypted.

The method may additionally include the step of initiating communication between the first user and the second user based upon the decrypted data. The initiation of network communication between the first user and the second user may be automatic upon decryption, as dictated by the network application or may be manual at the discretion of the user.

The invention is also embodied in specific methods for distributing network addresses for private use, such as Internet Protocol (IP) addresses, through a public distributed database system and methods for distributing service dependent addresses for private use, such as email addresses or telephone numbers, through a public distributed database. In the network address embodiments the encrypted network addresses may be stored in pre-existing resource records within the DNS or the resource records may be newly defined resource records. Examples of pre-existing resource records include "A", "AAAA" and "A6". In the service dependent address embodiments the encrypted service dependent addresses may be stored in pre-existing resource records within the DNS server or the resource records may be newly defined resource records. Examples of pre-existing resource records include "MX" and "NAPTR".

Additionally, the invention is embodied in a system for distributing private information through a public distributed database. The system includes a first digital device that includes a processing unit capable of network communication of at least a portion of encrypted data, a domain name system (DNS) device that receives encrypted data communicated from the first digital device and stores the at least a portion of encrypted data in associated memory; and a second digital device that includes a processing unit capable of network querying the DNS for at least a portion of the encrypted data based on encryption identifying data and capable of decrypting the at least a portion of the encrypted data based on keying material.

The first digital device may include an encryption application executed by the processing unit that is capable of encrypting data, although the encryption of the data that is communicated by the first digital device need not be encrypted at the first digital device.

The DNS device will, in one embodiment, include one or more resource records that are responsible for storing the encrypted data. The resource records that store the encrypted data are, in one embodiment, pre-existing resource records that can also accommodate the storage of non-encrypted clear text data. The resource records may provide for a flag indicator field that, when enabled, indicate that data is encrypted and that the encrypted data may not be compatible with semantic or syntax of the server. Such flagging of the resource record allows encrypted data to be stored therein without subjecting the data to syntax or semantic checks.

The second digital device may include a resolver library that determines an address for the domain name prior to querying the DNS and may provide a location for decryption. Additionally, alternate embodiments may provide for encryption to occur at the network application stage or at the TCP/IP stack, in conjunction with a network API, on behalf of the network application.

The invention is also embodied in a DNS device. The device includes an input that receives at least a portion of encrypted data and receives queries requesting at least a portion of the encrypted data, a processor in communication with the input that determines a storage location for the received encrypted data and processes the queries requesting at least a portion of the encrypted data, a storage unit in communication with the processor that includes one or more resource records that store encrypted data based on the determination of the processor and an output in communication with the processor that communicates at least a portion of the encrypted data based on the queries requesting at least a portion of the encrypted data.

Additionally, the invention is embodied in a mobile terminal device in network communication with a public distributed database system. The device includes one or more processors capable of encrypting data by a chosen encryption key, communicating the encrypted data to the public distributed database system, communicating at least the encryption key to a chosen recipient; querying the public distributed database system for at least a portion of the encrypted data and decrypting at least a portion of the encrypted data by use of the chosen encryption key. The one or more processors may additionally be capable of receiving secondary keying material and encryption identifying data from a secondary mobile terminal device, querying the public distributed database for at least a portion of secondary encryption data based on the encryption identifying data and decrypting the secondary encryption data based on the secondary keying material.

In an additional embodiment the invention is defined by an alternate mobile terminal device in network communication with a public distributed database system. The device includes a memory unit that stores contact information and a processing unit in communication with the memory unit that receives at least a portion of encryption keying material from a contact and automatically determines if the contact has stored contact information and, if the stored contact information exists, automatically stores the at least a portion of the encryption keying material with the stored contact information in the memory unit. The device may additionally include a decryption application executed by the processing unit that, upon receipt of encryption data from the public distributed database, automatically retrieves the keying material from the memory unit and automatically uses the keying material to decrypt the encryption data. In addition, the processing unit may further provide for receiving encryption identifying data and automatically querying a domain name system (DNS) to retrieve the at least a portion of the encrypted data related to the encryption identifying data.

Thus, the present invention provides systems, devices and methods for providing controlled use of information stored publicly within the domain name system (DNS). Controlled use is established by storing encrypted data at the DNS and transferring keying material, encryption identifying data and, optionally, reference to the corresponding service between requisite parties that have established a trust. The invention provides backward compatibility with existing DNS devices, in that, it provides for storage of encrypted data in existing resource records. The invention benefits from allowing storage in the DNS to be divided into both public and private classification, such that a user can identify and store certain public information that is useable to all parties that have access to the DNS, while other information that has been classified as private is only useable to parties which have established a trust and have exchanged requisite keying material, encryption identifying data and, optionally, reference to the corresponding service.

BRIEF DESCRIPTION OF THE DRAWINGS

Figure 1:
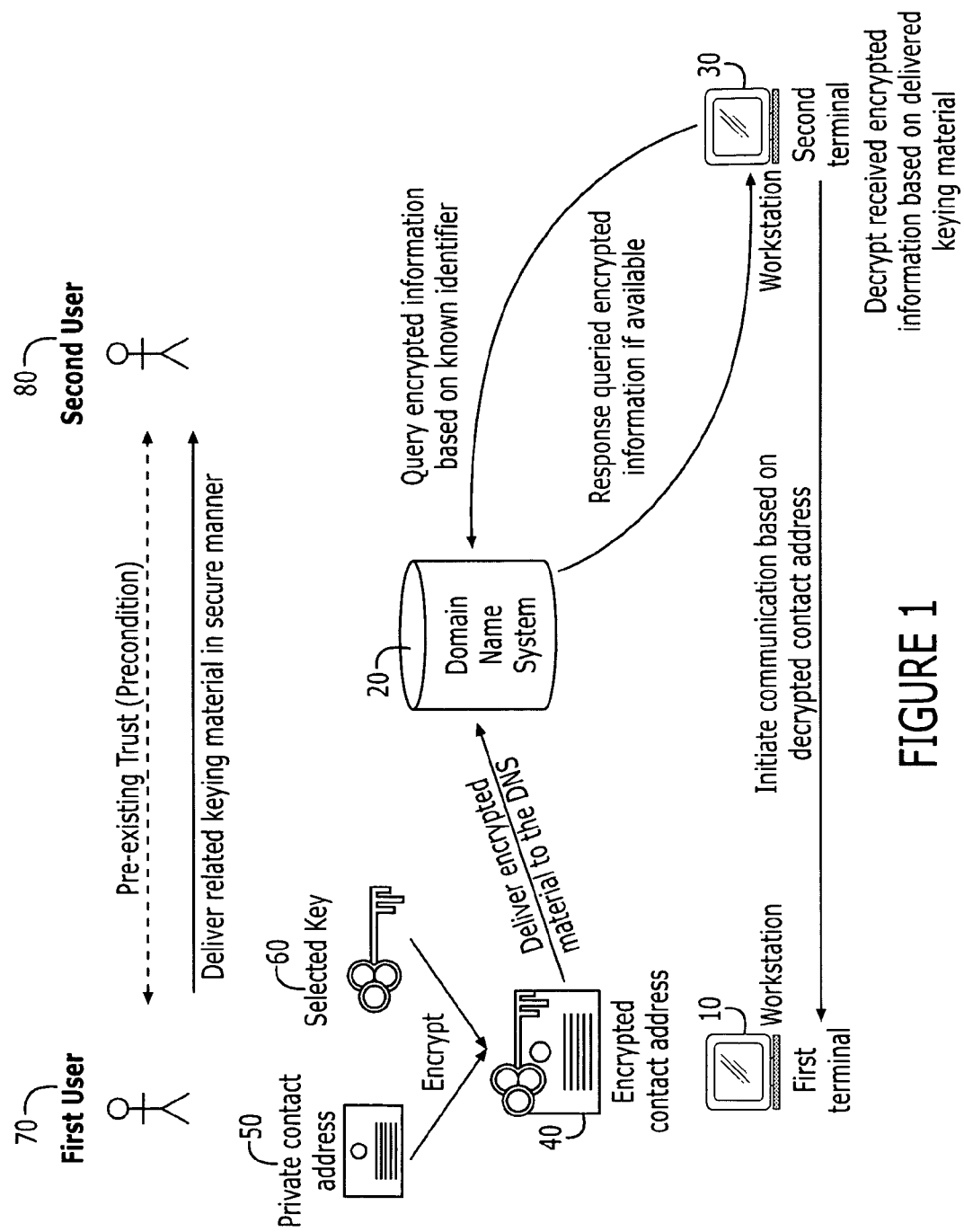

Having thus described the invention in general terms, reference will now be made to the accompanying drawings, which are not necessarily drawn to scale, and wherein:

FIG. 1 is a block diagram of a system for providing controlled use of private information stored publicly on a DNS server, in accordance with an embodiment of the present invention.

Figure 2:
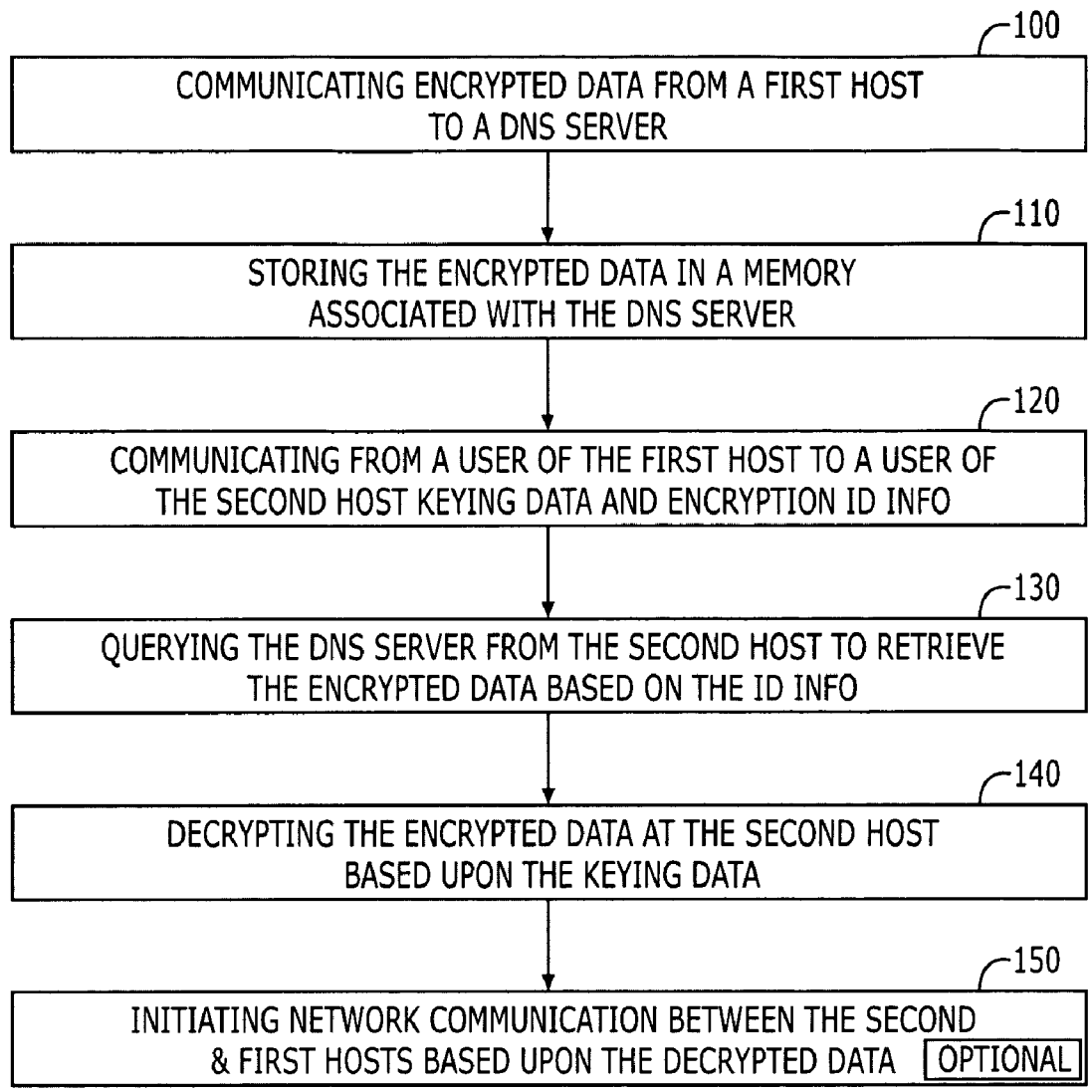

FIG. 2 is a flow diagram of a method for providing controlled use of information stored publicly at a DNS server, in accordance with an embodiment of the present invention.

Figure 3:
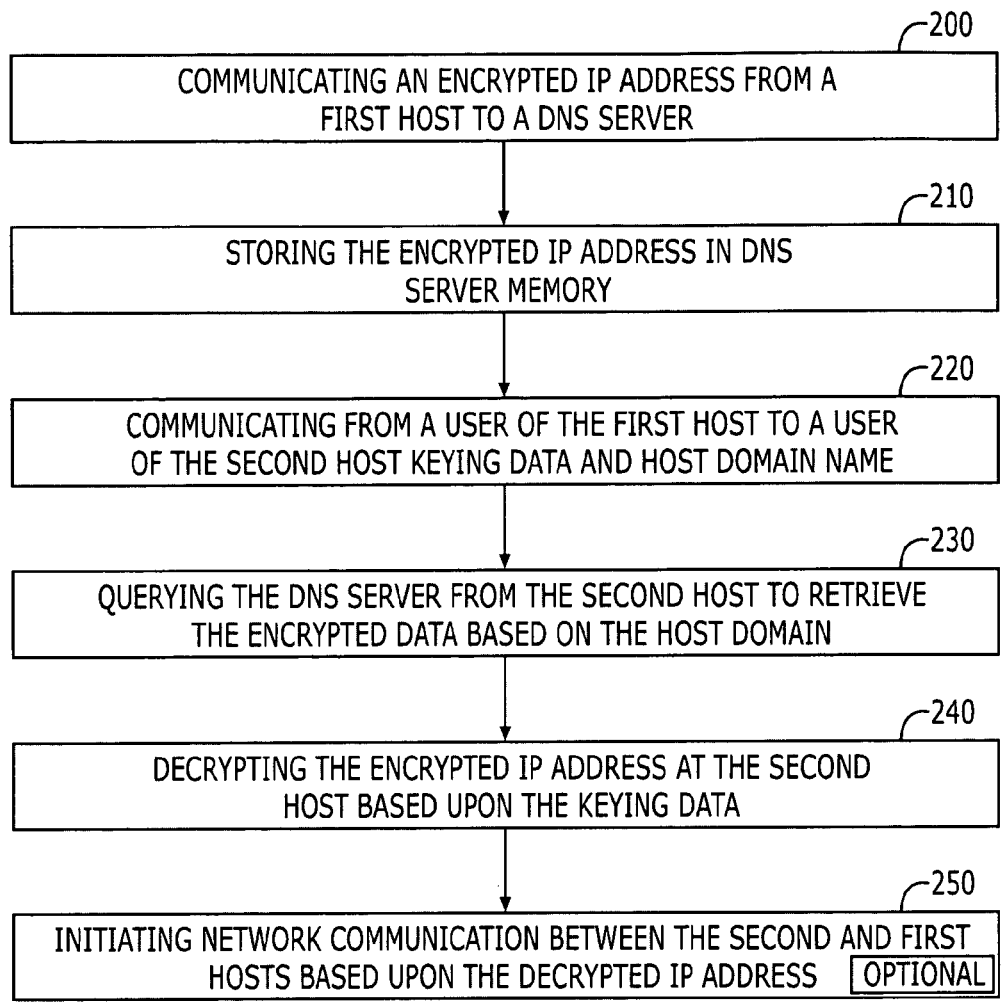

FIG. 3 is a flow diagram of a method for providing controlled use of network addresses, such as IP addresses, stored publicly at a DNS server, in accordance with an embodiment of the present invention.

Figure 4:
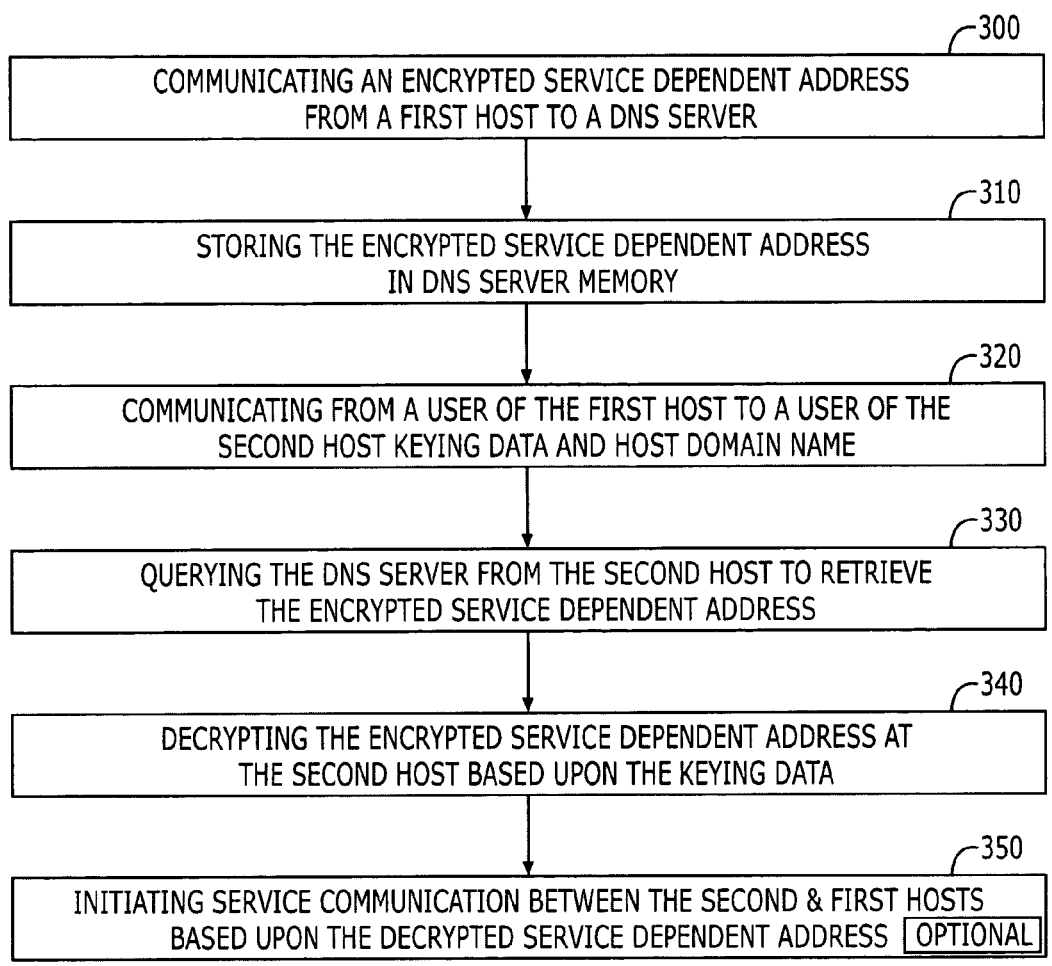

FIG. 4 a flow diagram of a method for providing controlled use of service dependent addresses, such as email addresses or telephone numbers, stored publicly at a DNS server, in accordance with an embodiment of the present invention.

Figure 5:
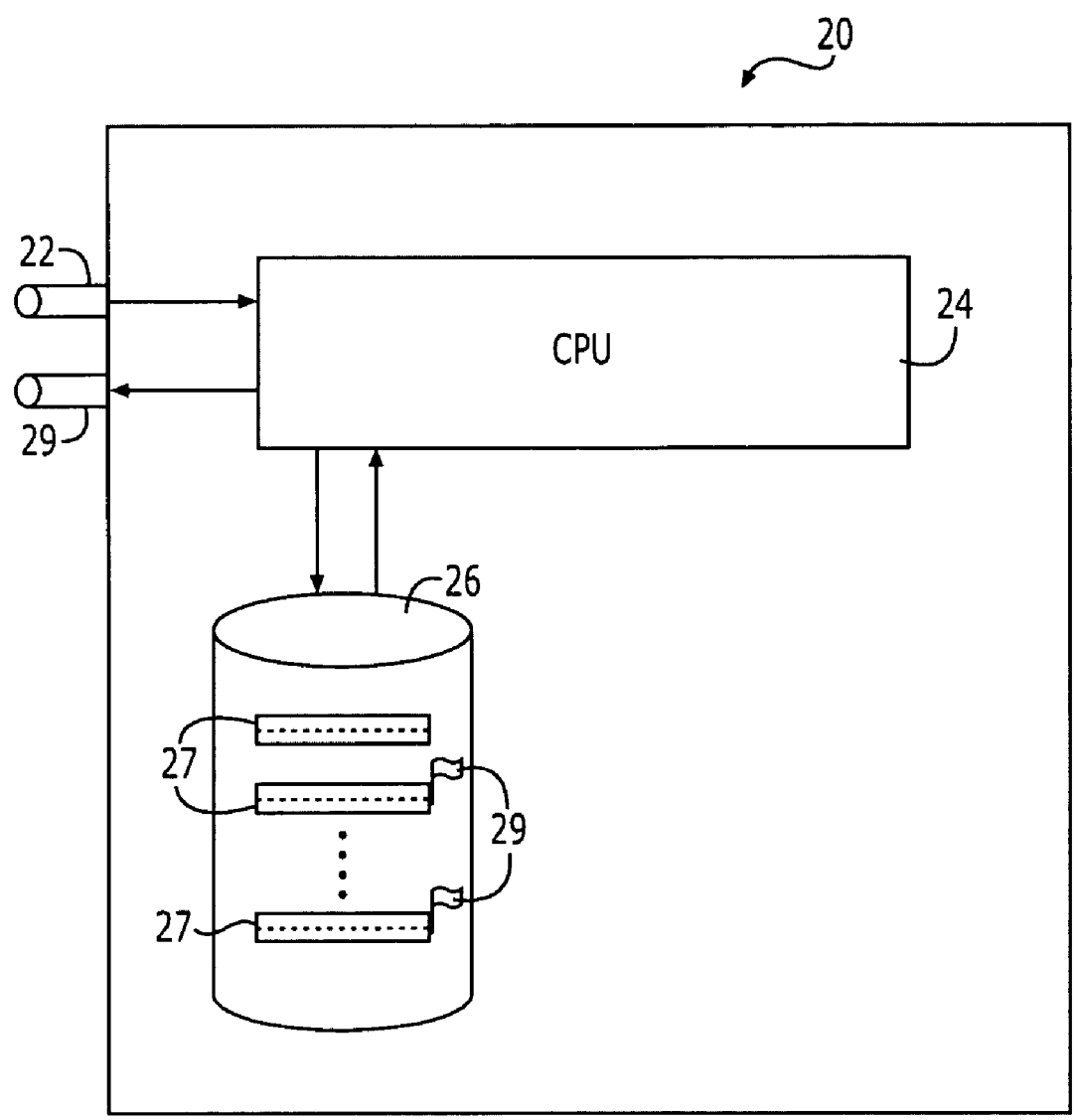

FIG. 5 is a block diagram of a DNS server that stores information for private use in a public database, in accordance with an embodiment of the present invention.

Figure 6C:
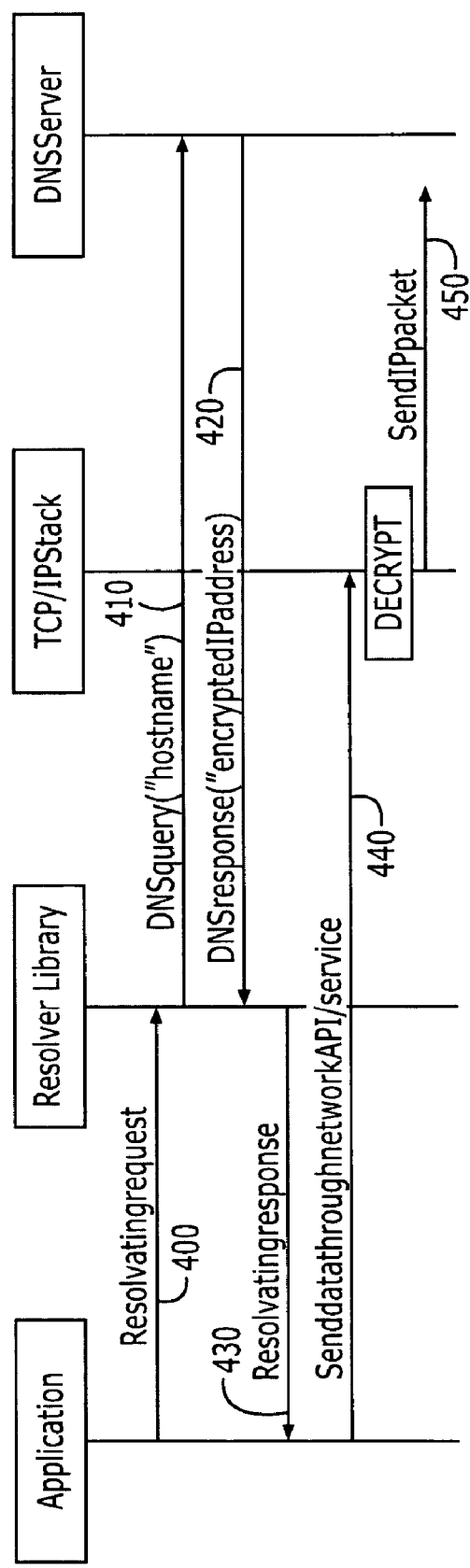

FIGS. 6A-6C are flow diagrams depicting the communication between a host and DNS server in retrieving encrypted data and subsequently decrypting the data at various stages, in accordance with an embodiment of the present invention.

Figure 7:
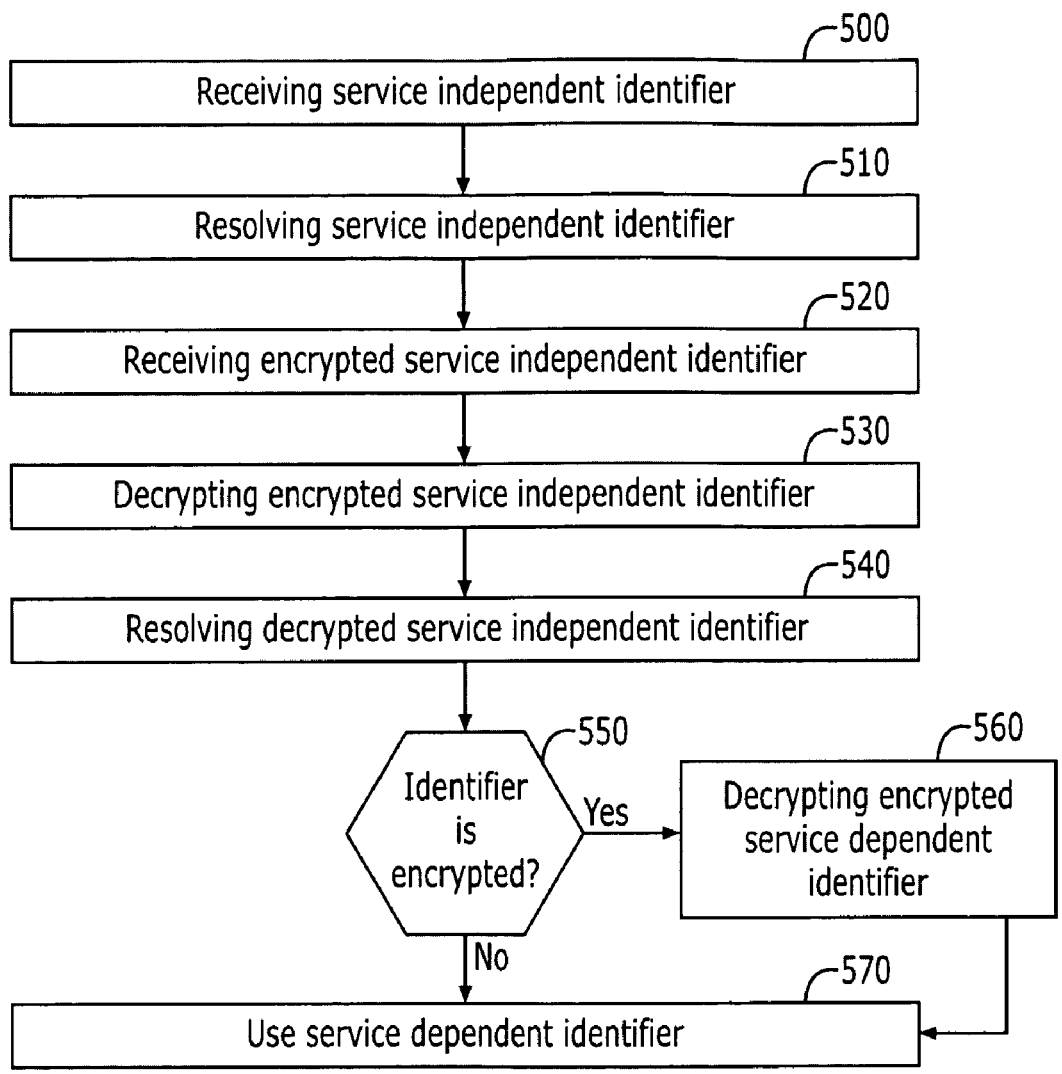

FIG. 7 is a flow diagram depicting a use case for secured DNS use, in accordance with an embodiment of the present invention.

Figure 8:
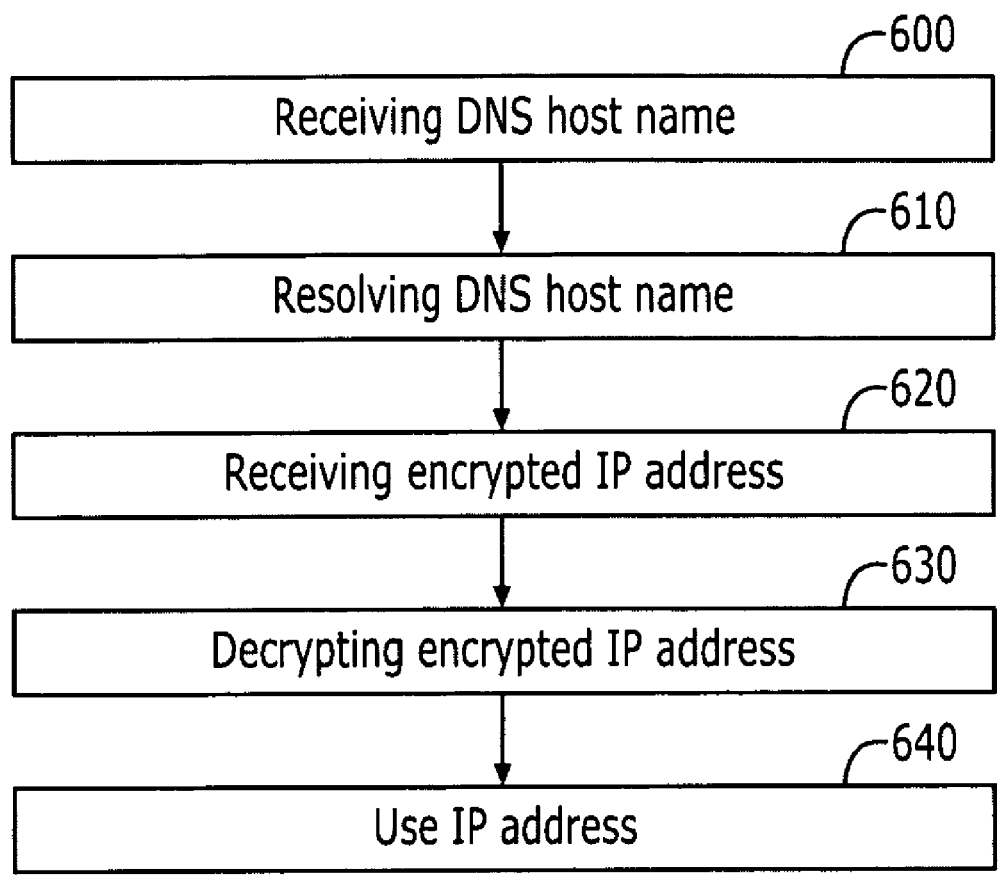

FIG. 8 is a flow diagram depicting another use case for secured DNS use, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods, systems and devices that can be used to distribute private or secured information through the public distributed database system and provide controlled use of the private information, specifically distribution and controlled use of private information through the DNS. The invention relies upon a pre-existing trust relationship between the parties that wish to share private data through the public distributed database. The pre-existing trust between parties may be a direct, such as direct knowledge or a direct relationship between the parties or the trust may be indirect, such that a third party has knowledge of the first and second parties. Private information, in the form of encrypted data is stored at the DNS device or at memory associated with the DNS device. The public nature of the DNS means that all devices in communication with the server will have access to the encrypted data, however; only those users of devices that have established a pre-existing trust relationship with the party that communicated the encrypted data to the DNS and have received keying material, encryption identifying data and, optionally, reference to the corresponding service will be able to decrypt the data and subsequently use the data.

FIG. 1 provides a block diagram of a system for secured use of the Domain name system (DNS) based on a preexisting trust, according to an embodiment of the present invention. The system of the present invention includes first digital device 10, a DNS device 20, such as a DNS server, and a second digital device 30. The first digital device 10 may communicate at least a portion of encrypted data 40 to the DNS device. It is noted that a portion may be any portion of encrypted data or any subset of a portion of encrypted data. In alternate embodiments of the system, the encrypted data may be communicated from another networked device or the data may be entered directly into the DNS device. The communication between the first digital device and the DNS device may be by a conventional wireless or wired communication medium. As such, the first digital device may comprise a personal computer (PC), a portable computer, a mobile telephone, a personal digital assistant (PDA) or any other device capable of wired or wireless network communication. In the wireless embodiments the first network node may include a device capable of Global System for Mobile communications (GSM), General Packet Radio Service (GPRS) communication, Universal Mobile Telecommunications Service (UMTS), Third Generation system for mobile (3G) communications, Enhanced Data for GSM Evolution (EDGE) communication or the like.

In one embodiment, the first digital device will execute a conventional encryption routine to encrypt the data that will subsequently be communicated to the DNS. However, the first digital device is not required to execute an encryption routine and may otherwise acquire and store encrypted data that is subsequently communicated to the DNS. In specific applications of the system of the present invention the encrypted data may include a contact address 50, such as an Internet Protocol (IP) address, a service dependent address, such as a Unified Resource Name (URN) or a Unified Resource Identifier (URI), for example an electronic mail (email) address, a Session Initiation Protocol (SIP) address, a HyperText Transfer Protocol (http) address, a File Transfer Protocol (ftp) address, an Lightweight Directory Access Protocol (ldap) address and the like. Network addresses and service dependent addresses may require limited accessibility or visibility because of security and/or privacy concerns. However, the system, methods and devices of the present invention are not limited encryption of network or service dependent addresses and may include encryption of any other data for private use distributed via the DNS. Encryption will occur based selected keying material 60 chosen by the encryption routine or otherwise chosen by the encrypting party.

The DNS device 20 will include or be associated with a memory unit (not shown in FIG. 1) that stores the encrypted data in resource records, in one embodiment, pre-existing resource records. The type of resource record will, in one embodiment, be indicative of the type of data that it stores and the function of the data. For example, in those application in which the encrypted data is related to a user's host location in the network, i.e., the IP address or the user's service dependent identities, i.e., the URN or the URI, the encrypted data may be stored in the "A" (IPv4 Address), "AAAA" (IPv6 Address), "A6" (IPv6 Address), "MX" (Mail Exchange) or "NAPTR" (Naming Authority Pointer) resource records. The A, AAAA and A6 resource records include information indicating a host's location in the network, i.e., the IP address, and the MX and NAPTR resource records include information indicating a user's service dependent identities. The MX resource record includes a primary mail host of a specific domain and the NAPTR resource record includes a variety of user contact addresses.

Additionally, the resource record that supports the storage of encrypted data may provide for various flag indicators. Flag indicators will, in one embodiment, indicate that data stored within the record is encrypted and the semantic and/or syntax of the data may be such that it does not warrant semantic and/or syntax checks. Avoiding semantic or syntax checks may be necessary in the instance in which the encrypted data, such as an IP address, is represented as an arbitrary string or the length of the string is greater than allowed by the semantic or syntax checks. By providing for the use of flag indicators, the encrypted data storage method of the present invention provides for the use of existing resource record and, therefore, requires no new resource records. It may also be necessary to define new flag values and the DNS device(s) need to be properly configured to support and interpret such new flags.

In one specific embodiment, a flag indicator may be implemented that, when enabled, indicates that data within the record is encrypted and that the semantics or syntax of the data may not be compatible with the clear text data. In this instance, enablement of the flag would provide for the DNS device 20 to forego both semantic and syntax checks on the resource record. In this example, the flagged resource record would provide for the storage of data represented as an arbitrary string and the length of the string may exceed the allowed limit, in one embodiment, 255 bits.

In another specific embodiment, a flag indicator may be implemented that, when enabled, indicates that data within the record is encrypted and that the semantics of the data may not be compatible. In this example, the format of the data is compatible and thus syntax checks may be performed on the resource record. Thus, in this instance, enablement of the flag would provide for the DNS device 20 to forego the semantic checks on the resource record. This type of flag would allow a resource record to store, for example, an encrypted IPv4 address that includes decimal numbers from 0 to 999 in decimal point separated format.

It is noted that certain DNS resource records, such as NAPTR, currently support fields for flags. However, in other instances, such as A, AAAA and A6, the resource records may in the future support flag fields but do not currently support flag fields. However, it may also be possible to store encrypted data in TXT (Text String) resource records. The TXT resource records map a DNS domain name specified in the owner field to a string of characters in text_string serving as descriptive text. As such, the TXT resource records provide for storing arbitrary data to the DNS. The semantic of the data stored in the TXT resource record is not fixed or known by the DNS, thus the meaning of the data is known by the client. The encrypted data format in the TXT resource record must be compatible with the IP address format in order for a client, such as second digital device 30, to be aware that additional DNS queries are required to obtain the encrypted data or a portion of the encrypted data stored in the corresponding TXT resource record. On such example of an acceptable format would be XXX.XXX.XXX.XXX, in which XXX represents a value from 0 to 255. It is noted that the examples provided herein for storage of encrypted data at the DNS are not to be construed as limiting. Other means of storing encrypted data at memory associated with a DNS server are also feasible and within the inventive concepts herein disclosed.

The second digital device 30 will be in network communication with DNS device 20. The communication between the second digital device and the DNS device may be by a conventional wireless or wired communication medium. As such, the second network node may comprise a personal computer (PC), a portable computer, a mobile telephone, a personal digital assistant (PDA) or any other device capable of wired or wireless network communication. Since all data stored by the DNS is publicly available, the second network node, as well as all other hosts in communication with the DNS server will have access to the DNS data, including any encrypted data stored in associated DNS memory. However, in order to decrypt the encrypted data a user must be able to provide the requisite keying material.

In the present invention, a first user 70 will establish a trust, either direct or indirect, with a second user 80 or the users will have established a pre-existing trust. In one embodiment, the first user will be associated with the first digital device and the second user will be associated with the second digital device. However, in alternate embodiments the users that wish to exchange private information through the public distributed database may be unassociated with the digital devices. Once the trust is established, the users will exchange keying material, encryption identifying data and, optionally, reference to the corresponding service. The exchange may occur by non-electronic means, such as oral communication or by electronic means, such as via network communication. However, the manner by which the keying material is communicated is irrelevant and outside of the scope of the present invention. The communication that includes the keying material may also include a reference to the service for which the keying material is intended (e.g., email, SMS, etc,)

In addition to keying material, the user of the first network node will communicate to the user of the second network node encryption identifying data, i.e., data that notifies a user that private encrypted information exists in the public distributed database. For example, encryption identifying data may take the form of the domain name of the first digital device. The digital device domain name is used as a means for traditional DNS resolving. The domain name provides the user of the second digital device a storage address associated with the DNS for the purpose of retrieving the encrypted data or at least a portion of the encrypted data. Since the storage locations within the DNS are considered public information, the domain name of the host is not considered to be secured information. Thus, the encryption identifying data may be communicated separate from the keying material or it may be communicated along with the keying material. In the same regard as the keying material, the encryption identifying data may be communicated from the first user to the second user by any means conceivable.

The second digital device 30 will query the DNS device 20, requesting the encrypted data associated with the first digital device's name or at least a portion of the encrypted data. It will be understood that a portion of the encrypted data may include any portion of the encrypted data or a portion of any portion of the encrypted data. The DNS server will retrieve and return at least a portion of the encrypted data to the second digital device. The second digital device will, in one embodiment, decrypt the encrypted data based on the keying material communicated to the user of the second network node. In alternate embodiments, the encrypted data may be sent to another network device for decryption. The device performing decryption may perform the decryption process at the resolver library stage, at the application stage or the TCP/IP stack may perform the decryption on behalf of application. Further explanation of the decryption schemes of the present invention are discussed infra. with regard to FIG. 5. Once the decrypting device has decrypted the data, the second digital device or any other digital device may use the data for its intended purpose. In those embodiments in which the encrypted data is the network address of the first digital device or a first digital device user's service dependent address, decryption will, in one embodiment, lead to network communication being initiated between the second digital device and the first digital device based on the decrypted data. Alternatively, a communication occurs between the first and second user based on the decrypted data, for example an email communication.

FIG. 2 is a flow diagram detailing a method for distributing private information through a public distributed database system, in accordance with an embodiment of the present invention. At step 100, communication of at least a portion of encrypted data to a DNS occurs. As previously noted, the device that communicates the encrypted data may perform an encryption application to encrypt the data or the device that communicates the encrypted data may store or have access to encrypted data that it subsequently communicates to the DNS. In the present invention, any suitable encryption application or encryption format can be used in the communication of the data without departing from the inventive concepts herein disclosed.

Upon receipt of the encrypted data the DNS, at step 110, will store the encrypted data in a memory unit associated with the DNS. In one embodiment, the memory unit allows for the data to be stored in a pre-existing resource record. The type of resource record used to store the encrypted data will be indicative of the type of the type of data encrypted. For example, in those specific embodiments in which the encrypted data is a network address, such as an IPv4 or IPv6 address, the encrypted data may be stored in the A, AAAA, A6 or the like resource record. Additionally, in those applications in which the encrypted data is a service dependent address, such as an email address or telephone number, the encrypted data may be stored in the MX, NAPTR or the like resource record. Alternatively, in those application in which DNS implementation modification is undesirable, i.e., applications in which certain resource records would currently not support encrypted data, it may possible to store the encrypted data in a TXT resource record or the like.

At step 120, a first user will communicate to a second user keying material and encryption identifying data. It should be noted that this step can be performed at any point prior to the querying of the DNS for at least a portion of the encrypted data and, therefore need not be performed after the DNS has stored the encrypted data. Specifically, the encryption identifying data may be communication to the second user at any time prior to querying the DNS for at least a portion of the encrypted data and the keying material may be communicated to the second user at any time prior to the decryption of the encrypted data. It is also noteworthy that the means by which the information is communicated from the first user to the second user is inconsequential and may be performed by any means feasible, both electronically and non-electronically. Additionally, the keying material and the encryption identifying data need not be communicated in the same communication or at the same point in time but, rather may comprise two separate communications performed at distinct times and/or in different manners.

Once the second user has received the encryption identifying data, in one embodiment, a domain name of the host, at step 130, querying of the DNS to determine at least a portion of the encrypted data will occur based upon encryption identifying data. The encryption identifying data, such as the domain name of the first network node, will be used by the DNS to retrieve the encrypted data that is associated with the domain name of the host. Once the DNS server has retrieved at least a portion of the encrypted data associated with the domain name of the host and the server has communicated the encrypted data to a decrypting device or application, at step 140, the decrypting device or application will decrypt the encrypted data based upon the keying material. In alternate methods, the decryption process may be performed at the resolver library stage, at the application stage, at the TCP/IP stack on behalf of the application or at any other acceptable stage or location in the network.

Once the decrypting device or application has performed the decryption process, at optional step 150, the decrypting device or another device associated with the second user may initiate network communication with the digital device associated with the first user based on the decrypted information, when, for example, the encrypted/decrypted information is a network address, a user's service dependent address or the like. FIG. 3 is a flow diagram detailing a specific method of the present invention, a method for distributing network addresses, such as Internet Protocol (IP) addresses intended for private use through a public distributed database system, in accordance with an embodiment of the present invention. For example, a mobile host, such as a mobile telephone, may have multiple predefined IP addresses each of which have a dedicated use and/or scope. These addresses are stored in the DNS and the invention provides for one or more of these IP addresses to be stored as private use addresses, via the use of an encryption process.

At step 200, communication of an encrypted IP address to the DNS occurs. The device that communicates the encrypted data may encrypt the IP address using any suitable application or the encrypted IP address may be otherwise communicated and stored at the communicating device. Upon receipt of the encrypted data the DNS server, at step 210 will store the encrypted IP address in a memory unit associated with the DNS, such as an A, AAAA, A6 resource record or the like that is, in one embodiment, used to store network IP addresses.

At step 220, a first user will communicate to a second keying material and encryption identifying data, such as a domain name. As previously noted, this step can be performed at any point prior to querying the DNS for the encrypted IP address and, therefore need not be performed after the DNS has stored the encrypted IP address. Additionally, the means by which the data is communicated from the first user to the second user is inconsequential and may be performed by any means feasible, both electronically and non-electronically. Additionally, the keying material and the encryption identifying data need not be communicated in the same communication or at the same point in time but, rather may comprise two separate communications performed at distinct times and/or in different manners.

Once the second user has received the encryption identifying data, in one embodiment, a domain name of the host, at step 230, querying the DNS to retrieve the encrypted IP address will occur based upon encryption identifying data. The encryption identifying data, such as the domain name, will be used by the DNS to retrieve the encrypted IP address data that is associated with the domain name.

Once the DNS has retrieved the encrypted IP address associated with the domain name and the server has communicated the encrypted IP address to the decrypting network device or application, at step 240, the decrypting device or application will decrypt the encrypted IP address based upon the keying material. In alternate methods, the decryption process may be performed at the resolver library stage, at the application stage, at the TCP/IP stack on behalf of the application or at any other applicable stage or location within the network.

Once the decrypting device or application has performed the decryption process, at optional step 250, the decrypting device or another device associated with the second user may initiate network communication with the digital device associated with the first user based on the decrypted IP address.

FIG. 4 is a flow diagram detailing a specific method of the present invention, a method for distributing user service dependent addresses, such as electronic mail (email) addresses or telephone numbers, intended for private use through a public distributed database system, in accordance with an embodiment of the present invention. Electronic Numbering (ENUM) is a framework that provides for telephone number mapping. In DNS it provides users DNS entries based on their telephone numbers. A user's data, such as an email, a SIP address or the like, is accessible through their phone number. A user may desire to keep some of the DNS information private while allowing other information to be public. For example, a user may desire one email address to be public while another email address is kept private. In such an instance, the present invention would provide for the public email address to be stored as clear text while the private email address is stored as encrypted data.

ENUM is a DNS-based framework defined in RFC 2916 in which an E.164 number defined by the International Telecommunications Union (ITU) can be represented using Fully Qualified Domain Name (FQDN) in a specific Internet domain (e164.arpa). In this framework one ENUM query consists of a set of DNS NAPTR queries and each NAPTR resource record is carrying some resource information like a Uniform Resource Identifier (URI) related to a corresponding number. E.164 numbers are globally unique and service independent identifiers that identify different devices connected to the telecommunication network. E.164 numbers are converted to DNS use in the following manner as defined in RFC2916. The E.164 number will include all parts, for example country code and/or area code. All non-digit characters are removed and dots are placed between numbers. The number is then re-arranged in reverse order and "e164.arpa" is appended to the end of the string. For example, the converted E.164 number may be, "9.8.7.6.5.4.3.2.1.9.8.5.3.e164.arpa". The NAPTR resource records are used to attach service specific contact information to previously created DNS entries. An E.164 encoded telephony number is given as an input for the DNS query and a URI is returned as a result.

At step 300, communication of an encrypted service dependent address to a DNS occurs. The communicating device may encrypt the service dependent address using any suitable application or the encrypted service dependent address may be otherwise communicated and stored at the communicating device. Upon receipt of the encrypted data the DNS, at step 310 will store the encrypted service dependent address in a memory unit associated with the DNS, such as a NAPTR resource record or the like that is typically used to store service dependent addresses, such as email addresses or telephone numbers.

At step 320, a first user will communicate to a second user keying material and encryption identifying data, such as the domain name. As previously noted, this step can be performed at any point prior to querying the DNS for the encrypted IP address and, therefore need not be performed after the DNS has stored the encrypted IP address. Additionally, the means by which the data is communicated from the first user to the second user is inconsequential and may be performed by any means feasible, both electronically and non-electronically. Additionally, the keying material and the encryption identifying data need not be communicated in the same communication or at the same point in time but, rather may comprise two separate communications performed at distinct times and/or in different manners.

Once the second user has received the encryption identifying data, in one embodiment, a domain name of the host, at step 330, querying the DNS to retrieve the encrypted service dependent address based upon encryption identifying data will occur. The encryption identifying data, such as the domain name, will be used by the DNS to retrieve the encrypted service dependent address data that is associated with the domain name.

Once the DNS has retrieved the encrypted service dependent address associated with the domain name of the host and the server has communicated the encrypted service dependent address to the decrypting device or application, at step 340, the decrypting device or application will decrypt the encrypted service dependent address based upon the keying material. In alternate methods, the decryption process may be performed at the resolver library stage, at the application stage, at the TCP/IP stack on behalf of the application or at any other applicable stage or location within the network.

Once the decrypting device or application has performed the decryption process, at optional step 350, the decrypting device or another device associated with the second user may initiate network communication with a device associated with the first user based on the decrypted service dependent address, i.e., send email communication; perform a telephone call or the like.

FIG. 5 is a block diagram of a DNS device, such as a DNS server, in accordance with an embodiment of the present invention. The DNS device 20 will include an input that that receives encrypted data and receives encrypted data queries. The input 22 is in communication with a processor 24 that determines proper storage for the received encrypted data, in one embodiment, based on data type. The processor 22 will also process queries requesting at least a portion of the encrypted data. The processor is in communication with a storage unit 26 that includes one or more resource records 27. The resource records will, in one embodiment, include resource records that store encrypted data based on data type. For example, the resource records that store encrypted data may be any pre-existing resource record or a newly defined resource record. Examples of pre-existing resource records include A, AAAA and A6 resource records that are used to store network IP addresses and NAPTR resource record that is used to store service dependent addresses, such as email addresses and telephone addresses (i.e., numbers). Additionally, the resource record may be a TXT resource record that stores encrypted data in an IP address compatible format.

Additionally, the one or more resource records may support optional flag indicators 28, in the form of a flag field. The flag indicators will indicate, when enabled, that data within the resource record is encrypted and that the semantics and/or syntax of the encrypted data is not compatible with the clear text data also stored in the resource record. Such a flag indication would allow the DNS device to forego requisite semantic and/or syntax checks, in the instance in which a flag is enabled.

The DNS device will also an include an output 29 that sends at least a portion of the encrypted data to a decrypting device or application based on the query and the processor determining the storage location of the encrypted data based on encryption identifying data in the query.

FIGS. 6A-6C are step diagrams detailing the various steps implemented by a network application using the DNS. Specifically the step encountered by an application requesting at least a portion of the encrypted data and subsequent decryption of the encrypted data, according to various embodiments of the present invention. At step 400, the network application, which is executed at a host, such as the second network node in FIG. 1, sends a resolving request to the host-internal resolver library requesting an IP address. The resolver library determines that the IP address is a privately stored IP address associated with the DNS or it determines a need to contact the DNS because it does not know how to resolve a domain name of the host and, at step 410, the resolver library sends a DNS query to the DNS. The DNS query will include the previously obtained encryption identifying data, such as the domain name of the host that communicated the encrypted data to the DNS. At step 420, the DNS responds to the query with a DNS response that includes the encrypted IP address. In the first embodiment shown in FIG. 6A, the resolver library performs the decryption process with the appropriate previously communicated keying material. Decryption can be performed automatically at the resolver library or at the bequest of the network application. At step 430, the resolver library responds to the network application with decrypted information, in the form of clear text parameters. Subsequently, upon receipt of the IP address from the resolver library, the network application will, at step 440, communicate data through the network according to the IP address and, at step 450, the TCP/IP stack will receive the data and further communicate the data in formatted IP packets.

In the FIG. 6A embodiment, since decryption is performed at the resolver library the network application is not responsible for knowing the keying material, i.e., the keying material may be communicated directly or indirectly via other applications to the resolver library. Additionally, in the FIG. 6 embodiment, the network application may be unaware that the IP address that it is requesting is a IP address for private use, i.e., that the requested IP address is an encrypted address. As such, the FIG. 6 embodiment only requires modification to existing resolver libraries and does not require modification to existing network applications.

In the FIG. 6B embodiment, the decryption process is performed at the network application after the network application receives encrypted data from the resolver library. In this embodiment the network application must have knowledge of the keying material and application specific support is required to decrypt at the application level.

In the FIG. 6C embodiment, the decryption process is performed at the TCP/IP stack on behalf of the network application. In one embodiment, a network application program interface (API) will perform the decryption at the TCP/IP stack. In this embodiment the encrypted IP address passes from the resolver library to the network application, which communicates the encrypted IP address through the network to the TCP/IP stack. As such, in this embodiment the application has no knowledge of the decrypted IP address. The keying material is, in one embodiment, communicated to the TCP/IP stack from the network application or from some other keying material entity.

The stage at which decryption processing occurs may be dependent upon the type of information being decrypted. For example, if the encrypted data is an encrypted IP address decryption may be performed in the TCP/IP stack. However, if the encrypted data is an encrypted email address, the email application may be configured to perform the requisite decryption process.

Service Independent Identifier Resolving Example

FIG. 7 provides for a flow diagram of a method for using the secured DNS of the present invention to resolve a service independent identifier, in accordance with an embodiment of the present invention. At step 500, a service independent identifier is received by a digital device and at step 510, the service independent identifier is resolved by querying the DNS for the encrypted data service independent identifier. At step 520, the digital device receives the encrypted service independent identifier and, at step 530, the encrypted data is decrypted based on related keying material, which the digital device has previously obtained. The decrypted data will include one or more service dependent identifiers and at step 540, a second resolving step occurs, whereby the DNS is queried for the one or more service dependent identifier. The digital device receives the result of the query, which may be several different application/service dependent addresses both encrypted and clear text. For example, Session Initiation Protocol (SIP), email and the like that are linked to the service independent identifier. Thus, at step 550, the digital device determines if the service dependent identifier is encrypted data or clear text data. If the determination is made that the service dependent identifier is encrypted then, at step 560, the encrypted service dependent identifier is decrypted and, at step 570, the service dependent identifier is used to initiate the service. If a determination is made that the service dependent identifier is clear text, then no decryption is necessary and the method proceeds to step 570, at which, the service dependent identifier is used to initiate the service.

DNS Host Name Resolving Example

FIG. 8 provides for a flow diagram of a method for using the secured DNS of the present invention to resolve a domain name of the host, in accordance with an embodiment of the present invention. At step 600, a domain name of the host is received by a digital device and at step 610, the domain name of the host is resolved by querying the DNS. At step 620, The DNS will return an encrypted IP address to the digital device and, at step 630, the digital device will decrypt the encrypted IP address based on keying material previously received by the digital device. The digital device will subsequently use the decrypted IP address for communication as dictated by the application.

Short Message Service (SMS) Example

In one embodiment of the invention two users of a wireless digital device, such as a cellular telephone have established a pre-existing trust. For example, the users have knowledge of each others cellular telephone number and have exchanged corresponding contact cards. The first user will have one or more contact addresses stored within the DNS, such that each of the contact addresses are accessible via a corresponding domain name. The domain name can be formed based upon the cellular phone number of the first user, for example using ENUM. If the first user desires to create an email address that is restricted to private use, the first user will choose an existing key, create an email address and encrypt the email address. Once the encrypted email address is created, the first user will communicate the encrypted email address to the DNS. The method by which the encrypted data is communicated to the DNS will be dependent upon the methods of communication supported by the DNS. For example, the DNS may support DNS service providers management interface based on http, via SMS to appropriate DNS service provider number or the like. In the illustrated embodiment we assume that the service provider supports the SMS example.

After the first user has communicated the encrypted email address to the DNS and the DNS has properly stored the encrypted address in an appropriate resource record, all DNS users can freely request the encrypted email address but only those users that have the keying material are able to decrypt the email address. The first user will distribute the key material to intended users in a secure manner. The first user can choose any appropriately secure media and method to convey the keying material. In the illustrated embodiment the first user sends the keying material to the second user via SMS. The SMS message that includes the keying material may also include (a) a reference to which service, such as email, that the keying material is intended to be used with; (b) a name resolution bootstrapping identifier that the keying material is intended to be used with, i.e., an identifier used in conjunction with the subsequent DNS query; (c) additional control information that provides the second user with information pertaining to the use of the encrypted data. It is noted that the SMS message or any other communication that includes keying material may include multiple keying materials and may be delivered to multiple recipients. Delivered information (keying material, and, optionally, one or more a, b and c items above) can be automatically stored if the sender, the first user in this example, is known and if the second user has configured their associated device to provide for such automation. In one example, this information can be stored under the first user's contact card in an appropriate application. Furthermore, a specific catalog for the respective service to store and retrieve the delivered information may be provided. In addition, independent of the service, a generic catalog for the delivered information may exist.

When the second user desires to send the first user an email message, a query is sent to the DNS service to resolve the email address based upon the cellular telephone number of the first user, i.e., the DNS name is ENUM based. The DNS returns an encrypted email address to the second user that is, in one embodiment, automatically decrypted based on the keying material stored in the second user's digital device. After the decryption has been performed the email address can be used in traditional mail service form and an email can be sent from the device of the second user to a device of the first user.

Thus, the present invention provides systems, devices and methods for providing controlled use of information stored publicly within the DNS. Controlled use is established by storing encrypted data at the DNS and establishing trust, in the form of transfer of keying material and other related information, with requisite parties. The invention provides backward compatibility with existing DNS devices, in that, it provides for storage of encrypted data in existing resource records. The invention benefits from allowing storage in the DNS to be divided into both public and private classification, such that a user can identify and store certain public information that is available to all parties that have access to the DNS, while other information that has been classified as private is only usable to parties which have established a trust.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for distributing private information through a public distributed database system, the method comprising:
   communicating at least a portion of encrypted data to a domain name system (DNS), wherein the at least a portion of encrypted data comprises at least one of an encrypted Internet Protocol (IP) address or an encrypted service dependent address;
   storing the encrypted data in a memory unit associated with the DNS;
   communicating encrypted data-related keying material and encryption identifying data from a first user associated with the encrypted data to a second user that has a pre-existing trust established with the first user;
   querying the DNS for at least a portion of the encrypted data based upon the encryption identifying data;
   responding with the at least a portion of the encrypted data to a digital device associated with the second user based on the query; and
   decrypting the at least a portion of the encrypted data based upon the keying material.

2. The method of claim 1, wherein the service dependent address is chosen from the group consisting of a Unified Resource Name (URN) and a Unified Resource Identifier (URI).

3. The method of claim 1, wherein the service dependent address is chosen from the group consisting of an electronic mail (email) address, a Session Initiation Protocol (SIP) address, a HyperText Transfer Protocol (http) address, a File Transfer Protocol (ftp) address, and an Lightweight Directory Access Protocol (ldap).

4. The method of claim 1, wherein communicating at least a portion of encrypted data to a DNS further comprises communicating, based on hypertext transfer protocol (http), at least a portion of encrypted data to a DNS.

5. The method of claim 1, wherein communicating at least a portion of encrypted data to a DNS further comprises communicating, via Short Message Service (SMS), at least a portion of encrypted data to a DNS.

6. The method of claim 1, wherein communicating at least a portion of encrypted data to a DNS further comprises communicating, via Multimedia Message Service (MMS), at least a portion of encrypted data to a DNS.

7. The method of claim 1, wherein communicating encryption data-related keying material and encryption identifying data from a first user associated with the encrypted data to a second user that has a pre-existing trust with the first user further comprises communicating encryption data-related keying material and a domain name from the first user associated with the encrypted data to the second user that has a pre-existing trust with the first user.

8. The method of claim 7, wherein querying the DNS for at least a portion of the encrypted data based upon the encryption identifying data further comprises querying the DNS to determine at least a portion of the encrypted data based upon the domain name.

9. The method of claim 1, wherein communicating encryption data-related keying material and encryption identifying data from a first user associated with the encrypted data to a second user that has a pre-existing trust with the first user further comprises communicating keying material and a first user telephone number from the first user associated with the encrypted data to a second user that has a pre-existing trust with the first use.

10. The method of claim 9, wherein querying the DNS for at least a portion of the encrypted data based upon the encryption identifying data further comprises querying the DNS to determine at least a portion of the encrypted data based upon the first user telephone number.

11. The method of claim 1, wherein communicating encryption data-related keying material from a first user associated with the encrypted data to a second user that has a pre-existing trust with the first user further comprises communicating via a communication medium chosen from the group consisting of Short Message Service (SMS), Multimedia Message Service (MMS), electronic mail (email) and instant messaging (IM).

12. The method of claim 1, wherein decrypting the at least a portion of the encrypted data based upon the keying material further comprises decrypting the encrypted IP address.

13. The method of claim 1, wherein decrypting the at least a portion of the encrypted data based upon the keying material further comprises decrypting the encrypted service dependent address.

14. The method of claim 1, further comprising initiating communication between a digital device associated with the second user and a digital device associated with the first user based upon the decrypted data.

15. The method of claim 14, wherein initiating communication between a digital device associated with the second user and a digital device associated with the first user based upon the decrypted data further comprises initiating communication between a digital device associated with the second user and a digital device associated with the first user based upon the decrypted IP address.

16. The method of claim 14, wherein initiating communication between a digital device associated with the second user and a digital device associated with the first user based upon the decrypted data further comprises initiating communication between a digital device associated with the second user and a digital device associated with the first user based upon the decrypted service dependent address.

17. The method of claim 1, further comprising communicating, from the first user to the second user, reference to a service that the keying material is intended to be used with.

18. The method of claim 1, further comprising storing the communicated keying material and encryption identifying data at the digital device associated with the second user.

19. The method of claim 18, wherein storing the communicated keying material and encryption identifying data at the digital device associated with the second user further comprising storing under a contact card associated with the first user in a contact card application.

20. The method of claim 1, further comprising communicating, from the first user to the second user, a name resolution bootstrapping identifier.

21. The method of claim 1, further comprising communicating, from the first user to a second user, control information related to the use of the encrypted data.

22. A method for distributing Internet Protocol (IP) addresses intended for private use through a public distributed database system, the method comprising:
communicating an encrypted IP address to a domain name system (DNS);
storing the encrypted IP address in a memory unit associated with the DNS;
communicating encryption data-related keying material and a domain name from a first user associated with the encrypted data to a second user that has a pre-existing trust established with the first user;
querying the DNS for the encrypted IP address based upon the domain name;
responding the encrypted IP address to a digital device associated with the second user based on the query;
decrypting the encrypted IP address based upon the keying material.

23. The method of claim 22, further comprising initiating communication between a digital device associated with the second user and a digital device associated with the first user based upon the decrypted IP address.

24. A method for distributing user service dependent addresses intended for private use through a public distributed database system, the method comprising:
communicating an encrypted service dependent address to a domain name system (DNS);
storing the encrypted service dependent address in a memory unit associated with the DNS;
communicating encryption data-related keying material and a first user telephone number from the first user associated with the encrypted data to a second user that has a pre-existing trust established with the first use;
querying the DNS for the encrypted service dependent address based upon the first user telephone number
responding the encrypted service dependent address to a digital device associated with the second user based on the query;
decrypting the encrypted first user service dependent address based upon the keying material.

25. The method of claim 24, further comprising initiating communication between a digital device associated with the second user and a digital device associated with the first user based upon the decrypted service dependent address.

26. The method of claim 24, wherein the service dependent address is chosen from the group consisting of a Unified Resource Name (URN) and a Unified Resource Identifier (URI).

27. The method of claim 24, wherein the service dependent address is chosen from the group consisting of an electronic mail (email) address, a Session Initiation Protocol (SIP) address, a HyperText Transfer Protocol (http) address, a File Transfer Protocol (ftp) address, and a Lightweight Delivery Access Protocol (ldap) address.

28. A system for distributing information intended for private use through a public distributed database, the system comprising:
a first digital device that includes a processing unit capable of network communication of encrypted data;
a domain name system (DNS) device that receives at least a portion of encrypted data communicated from the first digital device and stores the at least a portion of encrypted data in associated memory, wherein the at least a portion of encrypted data comprises at least one of an encrypted Internet Protocol (IP) address or an encrypted service dependent address; and
a second digital device that includes a processing unit capable of receiving encrypted data-related keying material from the first digital device based upon a pre-existing trust established with the first digital device, network querying the DNS for at least a portion of the encrypted data based on encryption identifying data and capable of decrypting the at least a portion of the encrypted data based on the keying material.

29. The system of claim 28, wherein the first digital device further includes an encryption application executed by the processing unit that is capable of encrypting data.

30. The system of claim 28, wherein the DNS device stores the at least a portion of encrypted data in one or more resource records.

31. The system of claim 30, wherein the one or more resource records that store at least a portion of encrypted data have an enabled flag indicator.

32. The system of claim 28, wherein the second digital device further includes a resolver library that determines an address for the DNS device prior to querying.

33. The system of claim 28, wherein the second digital device that includes a processing unit capable of decrypting the at least a portion of the encrypted data performs decryption at an application level.

34. The system of claim 28, wherein the second digital device that includes a processing unit capable of decrypting the at least a portion of the encrypted data performs decryption at the resolver library level.

35. The system of claim 28, wherein the second digital device that includes a processing unit capable of decrypting the at least a portion of the encrypted data performs decryption at a Transmission Control Protocol/Internet Protocol (TCP/IP) stack level.

36. The system of claim 28, wherein the first digital device is further defined as including a processing unit capable of communicating encrypted data via a network communication medium chosen from the group consisting of Short Message Service (SMS), Multimedia Message Service (MMS), Wireless Application Protocol (WAP), electronic mail, HyperText Transfer Protocol (HTTP) and HyperText Transfer Protocol Secure (HTTPS).

37. The system of claim 28, wherein the first digital device is further defined as including a processing unit that is capable of wireless communication of encrypted data.

38. The system of claim 28, wherein the first digital device is further defined as a cellular network telephone.

39. The system of claim 28, wherein the first digital device is further defined as a device chosen from the group consisting of a Global System for Mobile communications (GSM) device, a General Packet Radio Service (GPRS) device, a Universal Mobile Telecommunications Service (UMTS) device, a Third Generation system for mobile communications (3G) device and Enhanced Data for GSM Evolution (EDGE).

40. The system of claim 28, wherein the first digital device is further defined as an Internet Protocol (IP) enabled network device.

41. The system of claim 28, wherein the first digital device that includes a processing unit capable of network communication of encrypted data further defines the encrypted data as an email address.

42. The system of claim 28, wherein the first digital device that includes a processing unit capable of network communication of encrypted data further defines the encrypted data as an identifier associated with a telephone number.

43. The system of claim 28, wherein the processing unit of the second digital device executes an application that is capable of storing the keying material and the encryption identifying data in a contact card.

44. The system of claim 28, wherein the second digital device further includes a memory unit that stores a catalog capable of storing the keying material and the encryption identifying data.

45. The system of claim 44, wherein the catalog is specific to a service that the encrypted data is intended to be used with.

46. A domain name system apparatus comprising a processor configured to:

receive at least part of encrypted data from a first device, wherein the at least part of encrypted data comprises at least one of an encrypted Internet Protocol (IP) address or an encrypted service dependent address;

receive queries requesting at least part of the encrypted data from a second device, wherein the second device has a pre-existing trust established with the first device and has received encrypted data-related keying material based upon the pre-existing trust;

determine a storage location for the received encrypted data and process the queries requesting at least part of the encrypted data;

provide for storage of the encrypted data based on the determination;

provide for communication of at least part of the encrypted data based on the queries requesting at least part of the encrypted data.

47. The apparatus of claim 46, wherein the one or more resource records include resource records capable of storing an encrypted network address.

48. The apparatus of claim 47, wherein the one or more resource records are chosen from the group consisting of A, AAAA and A6 resource records.

49. The apparatus of claim 46, wherein the one or more resource records include resource records capable of storing an encrypted service dependent address.

50. The apparatus of claim 49, wherein the one or more resource records are chosen from the group consisting of MX and NAPTR resource records.

51. The apparatus of claim 46, wherein the one or more resource records include a TXT resource record.

52. The apparatus of claim 46, wherein the one or more resource records include a flag indicator for indicating if the resource record includes encrypted data.

53. The apparatus of claim 52, wherein the one or more resource records include a flag indicator for indicating if the resource record includes semantically compatible encrypted data.

54. The apparatus of claim 52, wherein the one or more resource records include a flag indicator for indicating if the resource record includes syntax compatible encrypted data.

55. An apparatus comprising:

one or more processors capable of encrypting data by a chosen encryption key, wherein the at least a portion of encrypted data com rises at least one of an encrypted Internet Protocol (IP) address or an encrypted service dependent address; communicating the encrypted data to a domain name system; communicating the encryption key to a chosen recipient based upon a pre-existing trust established with the chosen recipient; querying the public distributed database system for at least a portion of the encrypted data; and decrypting the at a least a portion of the encrypted data by use of the chosen encryption key.

56. The apparatus of claim 55, wherein the one or more processors are capable of receiving secondary keying material and encryption identifying data from a secondary mobile terminal device, querying the public distributed database for secondary encryption data based on the encryption identifying data and decrypting the secondary encryption data based on the secondary keying material.

57. An apparatus comprising a processing unit configured to:

receive at least a portion of encryption keying material from a contact based upon a pre-existing trust established with the contact;

determine if the contact has stored contact information and, if the stored contact information exists, automatically store the at least a portion of the encryption keying material with the stored contact information;

receive encryption identifying data from the contact;

query a domain name system to retrieve at least a portion of encrypted data related to the encryption identifying data, wherein the at least a portion of encrypted data comprises at least one of an encrypted Internet Protocol (IP) address or an encrypted service dependent address;

retrieve the stored at least a portion of the encryption keying material; and decrypt the at least a portion of encrypted data using the at least a portion of the encryption keying material.

58. The apparatus of claim 57, wherein the processing unit automatically stores the encryption identifying data with the stored contact information in a memory unit.

59. A method for resolving a service independent identifier at a digital device, the method comprising:

receiving keying material from a remote user based upon a pre-existing trust established with the remote user;

receiving a service independent identifier at a digital device;

resolving the service independent identifier by querying a domain name system;

receiving an encrypted service independent identifier, the encrypted service independent identifier having been stored in encrypted form in a memory associated with the domain name system, at the digital device; and decrypting the encrypted service independent identifier at the digital device using the received keying material.

60. The method of claim 59, wherein the decrypted service independent identifier includes a service dependent identifier and the method further comprises resolving the service dependent identifier by querying a domain name system.

61. The method of claim 60, further comprising receiving a clear text service dependent identifier at the digital device and initiating the service based on the identifier.

62. The method of claim 60, further comprising receiving an encrypted service dependent identifier at the digital device, decrypting the encrypted service dependent identifier and initiating the service based on the decrypted identifier.

63. A method comprising:

receiving at least a portion of encrypted data at a domain name system (DNS) from a first device, wherein the at least a portion of encrypted data comprises at least one of an encrypted Internet Protocol (IP) address or an encrypted service dependent address;

storing the encrypted data in a memory associated with the DNS;

receiving a query of the DNS from a second device for at least a portion of the encrypted data based upon encryption identifying data, wherein a user of the second device has a pre-existing trust established with a user of the first device and wherein the user of the second device has received encrypted data-related keying material based upon the pre-existing trust; and responding with the at least a portion of the encrypted data to the second device.

\* \* \* \* \*

UNITED STATES PATENT AND TRADEMARK OFFICE
CERTIFICATE OF CORRECTION

| | |
|---|---|
| PATENT NO. | : 7,502,923 B2 |
| APPLICATION NO. | : 10/943050 |
| DATED | : March 10, 2009 |
| INVENTOR(S) | : Pöyhönen et al. |

It is certified that error appears in the above-identified patent and that said Letters Patent is hereby corrected as shown below:

<u>Column 20,</u>

Line 46, "com rises" should read --comprises--.

Signed and Sealed this

Twenty-fifth Day of August, 2009

David J. Kappos
*Director of the United States Patent and Trademark Office*